United States Patent [19]

McKenzie

[11] Patent Number: 5,065,498

[45] Date of Patent: Nov. 19, 1991

[54] MULTIPLE BIT POWER DRILL

[76] Inventor: Archibald M. McKenzie, 212 Hiawatha Dr., West Vancouver, B.C., Canada, V7P 1E1

[21] Appl. No.: 505,675

[22] Filed: Apr. 5, 1990

[51] Int. Cl.⁵ ............................................ B23Q 3/157
[52] U.S. Cl. ........................................ 29/568; 408/35
[58] Field of Search ................................ 29/568, 26 A; 408/241 R, 35; 81/437, 439, 177.4, 57.14; 173/46

[56] References Cited

U.S. PATENT DOCUMENTS

| | | | |
|---|---|---|---|
| 2,679,770 | 6/1954 | Carter et al. | 408/241 R |
| 4,572,038 | 2/1986 | Graham | 81/439 |
| 4,604,005 | 8/1986 | Russ | 408/35 |
| 4,653,356 | 3/1987 | Golden | 81/57.14 |
| 4,762,036 | 8/1988 | Orlitzky et al. | 81/437 |
| 4,893,529 | 1/1990 | Lin | 81/439 X |

Primary Examiner—William Briggs
Attorney, Agent, or Firm—Barrigar & Oyen

[57] ABSTRACT

The present invention provides an electric power drill having a magazine containing a multiplicity of bits from which a single bit is selected using a bolt action. The magazine is cylindrical and is rotated about a central axis to select a bit. The bit is loaded into the chuck by forward motion of the bolt and is tightened into operating position by the chuck. The bit is removed from the chuck by retraction of the bolt.

16 Claims, 4 Drawing Sheets

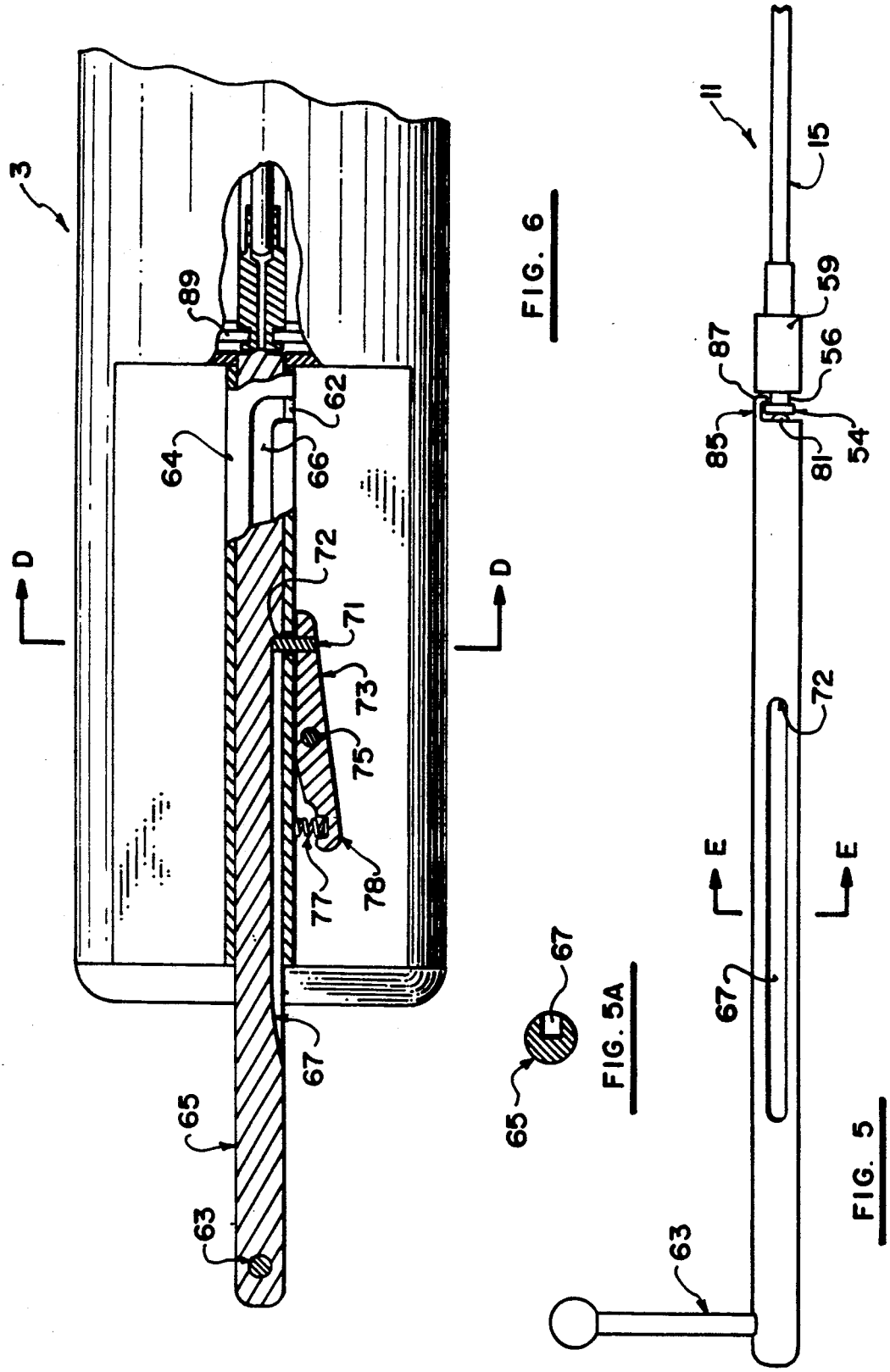

MULTIPLE BIT POWER DRILL

BACKGROUND OF THE INVENTION

The invention relates to the field of power hand tools and more particularly to the field of power drills.

In existing power drills, bits of different sizes or types are stored separately from the drill. When it is desired to use a particular drill bit, the bit is selected from the storage container and is inserted into the chuck and tightened in place in the chuck. The problem with this existing design is that it is necessary for the user to carry a separate bit container, and to manually transfer the bits back and forth from the storage container to the drill chuck. This can result in lost bits.

There is therefore a need for a power drill in which the bits can be quickly and efficiently loaded from and stored in the drill itself.

SUMMARY OF THE INVENTION

The present invention provides an electric power drill having a magazine containing a multiplicity of bits from which a single bit is selected using a bolt action. The bits are stored in a cylindrical magazine within the drill and are loaded directly from the magazine to the chuck of the drill using a bolt action. The magazine is rotated about a central axis to select a bit. The bit is loaded into the chuck by forward motion of the bolt and is tightened into operating position by the chuck. The bit is removed from the chuck by retraction of the bolt.

A multiple bit power drill is provided which comprises a) a housing containing a cylindrical magazine rotatable about a longitudinal axis, the magazine being provided with an array of parallel longitudinal bores; b) a plurality of drill bit elements, each bit element being removably located in one of the bores, each bit element having a drill bit at one end and a surface perpendicular to the length of the bit at the opposite end, and a groove formed in the bit element transversely to the length of the bit adjacent the opposite end; c) a chuck assembly for receiving a drill bit and securing a bit in the assembly; d) motor means for rotating the chuck assembly; and e) means for ejecting one of the drill bit elements from a bore and inserting the bit element into the bore in the chuck assembly, the ejection means being movable between a first rearward position withdrawn from the magazine and in which the magazine is free to rotate, to a second forward position in which the ejection means extends through one of the bores in the magazine to push a bit element out of the bore, the ejection means comprising a surface for contacting the end surface of the bit element and a hook element which is adapted to pass freely through the groove of the bit element in the direction transverse to the length of the bit element when the ejection means is in the first position, and to bear against the rearward surface of the groove of the bit element when the ejection means is moved from the second position to the first position; wherein the housing comprises a bit guiding means fixed to the housing and adapted to extend into the grooves of the drill bit elements when the drill bit elements are located in the bores, the guiding means provided with an aperture in the vicinity of the ejection means to allow passage of the ejection means through the guiding means, whereby the groove of a bit element is engaged by the guiding means when the magazine is rotated to guide the bit element into a position wherein the hook element of the bolt is located in the groove when the bit element is adjacent said aperture and the ejection means is in the first position.

BRIEF DESCRIPTION OF THE DRAWINGS

In drawings which illustrate a preferred embodiment of the invention:

FIG. 5 is a side view of the bolt and drill holder and associated drill bit in isolation;

FIG. 5A is a cross-sectional view taken along lines E—E of FIG. 5;

FIG. 6 is a cross-sectional view taken along lines C—C of FIG. 1;

DETAILED DESCRIPTION OF A PREFERRED EMBODIMENT

Figure 1:
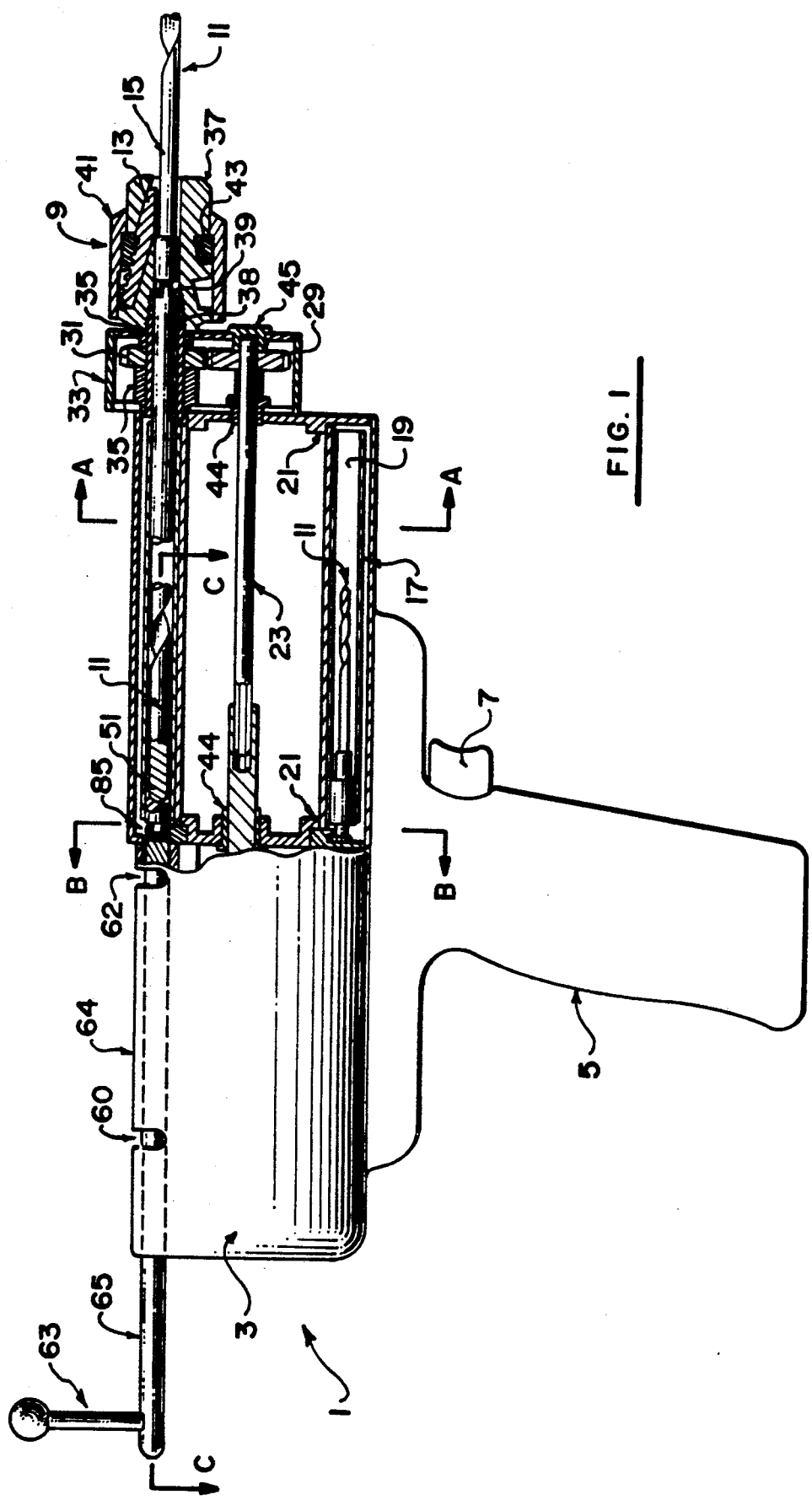
FIG. 1 is a side view of the invention, partially cut away to expose the bit magazine and chuck assembly.
Figure 2:
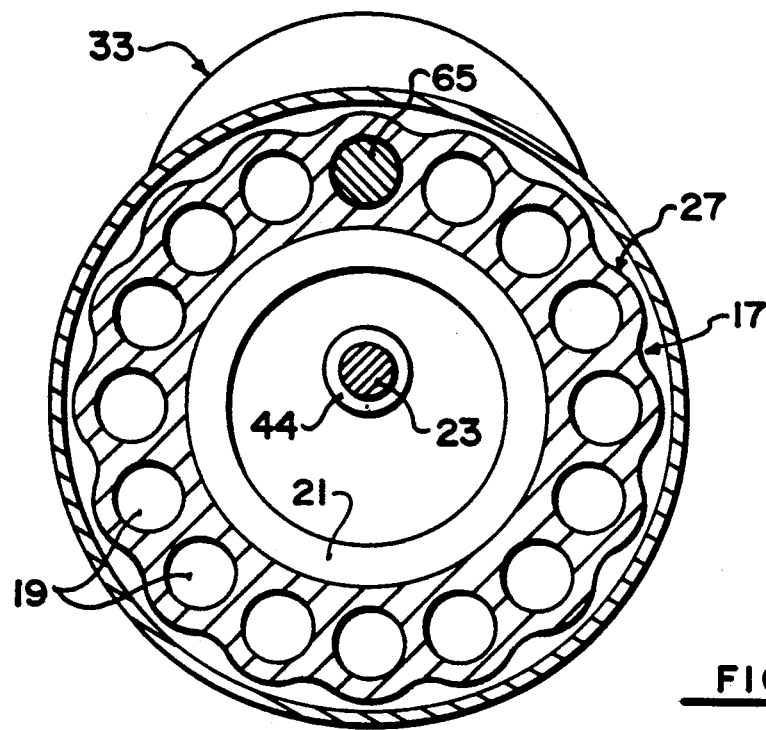
FIG. 2 is a cross-sectional view taken along lines A—A of FIG. 1, with the drill bit elements not shown.

With reference to FIG. 1, the power drill of the invention, designated generally as has a housing 3 which houses an electric motor (not shown), a handle 5 with a trigger switch 7, and chuck assembly 9 for holding drill bit 11. Chuck 9 has three jaws 13 which are tightened against the shank 15 of drill bit 11.

A cylindrical magazine 17 is mounted in the housing 3 for rotation about a lengthwise axis in the housing. The magazine 17 has an array of longitudinal bores 19 spaced equidistantly around the circumference of the magazine. Each bore 19 is sized to receive a drill bit 11. The magazine 17 is mounted on two cylindrical bearings 21 for rotation about the central longitudinal axis of the bearings. In order to allow the magazine to be rotated by hand, a portion (not shown) of the housing is cut away to reveal the corrugated exterior surface 27 of the magazine which can be contacted by the fingers of the user.

The electric motor mounted in housing 3 drives, via reduction gears, a drive shaft 23 which passes through the center of the magazine 17 on bearings 44. Switch 7 may act as a throttle to variably control the speed of the electric motor. The end of drive shaft 23 is supported in end bearing 45 which is mounted in secondary housing 33. Gear 29 is mounted coaxially adjacent the end of drive shaft 23. Gear 29 meshes with cooperating gear 31 which in turn is connected to chuck assembly 9. Chuck assembly 9 rotates within secondary housing 33 on shaft 38 mounted on bearings 35.

Chuck assembly 9 is a conventional Jacobs chuck assembly, comprising a metal body 37, with the modification that a central bore 39 is provided. An exterior cylindrical sleeve 41 is rotatable about body 37 and is attached to a worm gear 43. Worm gear 43 meshes with teeth on jaws 13 to move the jaws into contact with drill bit 11. Body 37 has a hole (not shown) for receiving the end of a chuck key for turning sleeve 41 and tightening jaws 13 against the drill bit.

Figure 8:
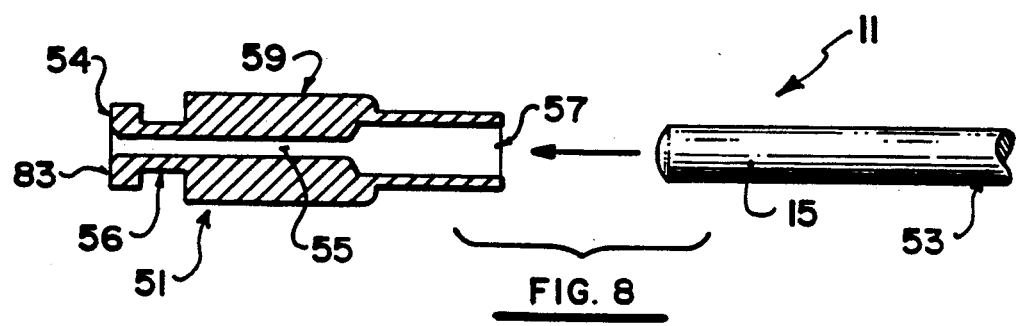
FIG. 8 is an exploded cross-section of the drill bit element used in the invention.

With reference to FIG. 8, the drill bit 11 consists of bit holder 51 and bit 53. Bits 53 are of various standard sizes. Shank 15 of bit 53 is forced into socket 57 of bit holder 51 in an interference fit. Bit holder 51 has an enlarged central cylindrical area 59 which is sized to slide freely but snugly in bores 19 and 39. The end of bit holder 51 has a cylindrical head 54 and cylindrical neck 56. The bit holder has a bore 55 which allows the insertion of a pin to eject a broken bit. Each bore 19 of magazine 17 is provided with a bit assembly 11 having a bit 53 of a different standard size.

Housing 3 is also provided with a bolt assembly 61, having handle 63 and shaft 65. Shaft 65 has a tapered keyway 67. Shaft 65 slides in an elongated guide 64 having a slot 66 along its upper side to permit the passage of handle 63, and vertical slots 60 and 62 which permit the handle 63 to be rotated 90 degrees to prevent longitudinal movement. A rectangular key 71 slides in keyway 67. Key 71 is fixed to one end of a lever 73 which pivots on pin 75 and is biased at the end opposite the key 71 by a spring 77. When handle 63 is withdrawn to the magazine rotation position shown in FIG. 1, key 71 abuts against shoulder 72, preventing the bolt from being further withdrawn without pressing end 78 inwardly towards bolt 61. Sliding bolt 61 forwardly causes key 71 to leave keyway 67 and allows handle 63 to be rotated into forward slots 60 or 62. Sliding bolt 61 to its forwardmost position places the associated bit in working position in the chuck assembly 9 also as shown in FIG. 1. Slot 60 provides an intermediate carrying position for the bolt in which the associated bit does not extend out of the chuck assembly, and the bolt does not extend rearwardly beyond the housing, and the magazine cannot be rotated.

Bolt 61 can be completely removed with an attached bit, for example to repair a broken bit. This is done by pressing end 78 of lever 73 to remove key 71 from keyway 67. The bolt is then pulled rearwardly from the tool, drawing with it the bit element currently in position for loading.

The end of shaft 65 has a thrust bearing 81 which provides a solid contact with the end surface 83 of the bit holder head 54 when the bolt is in the forward operating position. The thrust bearing 81 absorbs the force applied against the end of the bit in operation, while permitting free rotation of the bit. The end of shaft 65 is also provided with a finger 85 which has a hooked end 87 which is configured to extend around head 54 and down towards neck 56, as shown in FIG. 6.

Figure 3:
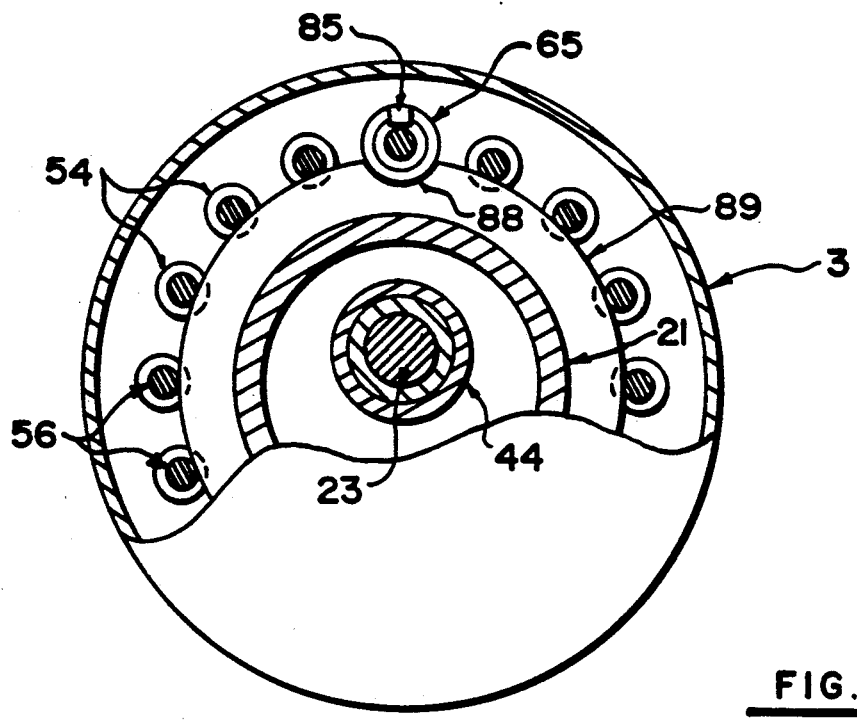
FIG. 3 is a cross-sectional view taken along lines B—B of FIG. 1.
Figure 4:
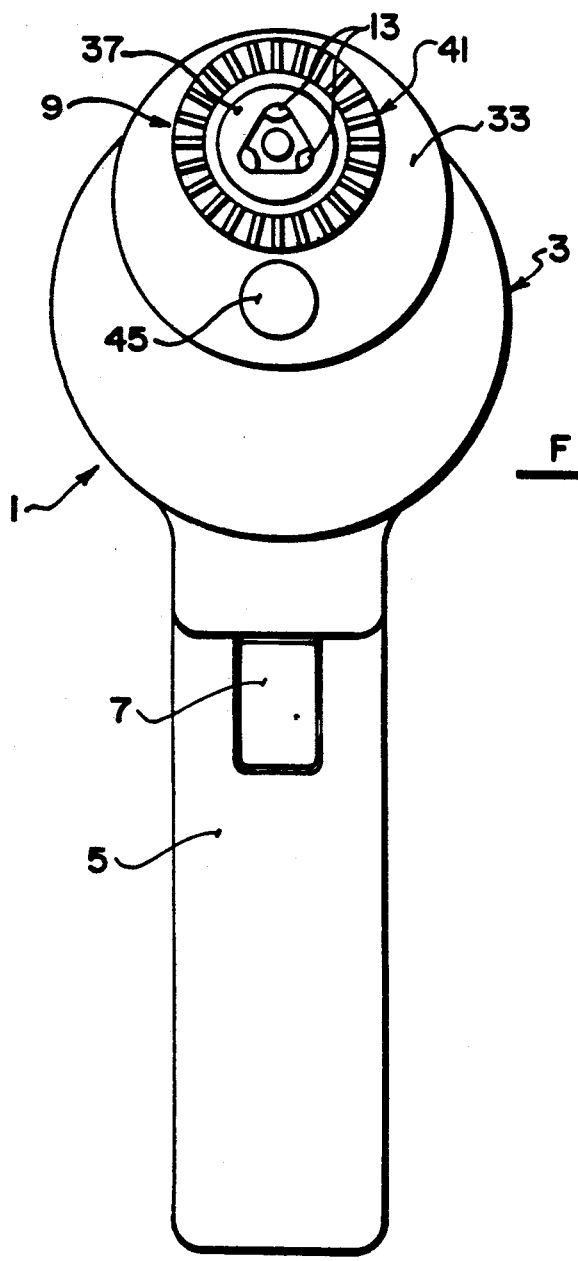
FIG. 4 is a front view of the invention with the drill bit retracted from the chuck.
Figure 7:
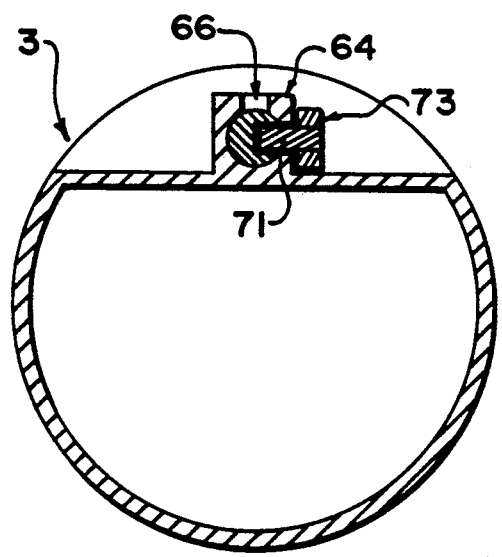
FIG. 7 is cross-sectional view taken along lines D—D of FIG. 6.

As best illustrated in FIG. 3, the housing 3 is provided with a fixed annular ring 89 which is coaxial with the magazine and acts as a track to guide and retain the bit holder heads 54 in position. The grooves formed by the neck 56 of each bit holder 51 slide in the track formed by ring 89 and are thus held in position to be engaged by the hooked end 87 of the bolt 65. Ring 89 has one circular notch 88 which corresponds to the location of chuck bore 39 and bolt shaft 65 and is large enough to allow passage of the bit head 54. In this way bits are prevented from moving in a bore 19 until the bore is aligned with aperture 88, chuck bore 39, and hook 87.

In operation, the user selects the desired bit by rotating magazine 17 until the bit is in the selected position aligned with bolt shaft 65 and chuck bore 39. An indicator of which bit is in the selected position can be provided by a window in the housing above a series of bit size indicators arrayed around the circumference of the magazine in locations corresponding to the particular bits. When the desired bit is in the selected position, bolt 61 is pushed forward using handle 63 until it reaches the forwardmost position, at which point handle 63 may be rotated to the right into slot 62. The action of bolt 61 moving forward brings thrust bearing 81 into contact with face 83 of the drill bit holder, and forces it forward through its bore 19 and into chuck bore 39. The dimensions are such that when bolt 61 is in its forwardmost position, drill bit 53 is extending the required amount from the chuck assembly 9. The chuck assembly is then tightened onto the drill bit 11 in the conventional manner using a chuck key. Squeezing of trigger 7 then activates the electric motor, rotating the chuck assembly 9 with attached drill bit 11. It will be apparent that finger 85 of bolt 61 is slightly spaced from the rotating drill bit in the forward operative position, as illustrated in FIG. 1.

To change the operating drill bit, the chuck assembly is loosened from the drill bit 11 in the usual fashion. Handle 63 is rotated to the vertical position and retracted. This brings finger 85 into contact with head 54 of drill bit holder 51, and causes the drill bit 11 to be withdrawn from the chuck as the bolt is withdrawn. When the bolt shaft 65 exits from the magazine and key 71 abuts shoulder 72, the magazine can then be rotated, thereby rotating the previously selected bit out of contact with finger 85 and allowing the selection of a new bit.

As will be apparent to those skilled in the art, various modifications and adaptations of the structure above described may be made without departing from the spirit of the invention, the scope of which is to be construed in accordance with the accompanying claims. For example, rather than using a manual rotation of the magazine and bolt action, an automatic means of rotating the magazine and ejecting the bit from the magazine could be utilized.

I claim:
1. A multiple bit power drill comprising:
a) a housing;
b) a cylindrical magazine mounted in said housing for rotation about a longitudinal axis, said magazine provided with an array of parallel longitudinal bores open at either end thereof;
c) a plurality of drill bit elements, each said bit element being removably located in one of said bores, each said bit element having a drill bit at one end and a surface perpendicular to the length of the bit at the opposite end, and an annular groove formed in the bit element transversely to the length of the bit adjacent the opposite end;
c) a chuck assembly having a central bore for receiving a drill bit element and means for releasably securing said bit element in said assembly;
d) motor means for rotating said chuck assembly; and
e) means for ejecting one of said drill bit elements from a bore and inserting said bit element into said bore in said chuck assembly, said ejection means being movable between a first rearward position withdrawn from said magazine and in which said magazine is free to rotate, to a second forward position in which said ejection means extends through one of said bores in said magazine to push a bit element out of said bore, said ejection means comprising a surface for contacting the end surface of said bit element and a hook element which is adapted to pass freely through said groove of said bit element in the direction transverse to the length of said bit element when said ejection means is in said first position, and to bear against the rearward surface of said groove of said bit element when said ejection means is moved from said second position to said first position;

wherein said housing comprises a bit guiding means fixed to said housing and adapted to extend into said grooves of said drill bit elements when said drill bit elements are located in said bores, said guiding means provided with an aperture in the vicinity of said ejection means to allow passage of said ejection means through said guiding means, whereby said groove of a bit element is engaged by said guiding means when said magazine is rotated to guide said bit element into a position wherein said hook element of said ejection means is located in said groove when said bit element is adjacent said aperture and said ejection means is in said first position.

2. The multiple bit power drill of claim 1 wherein said retaining means comprises an annular ring.

3. The multiple bit power drill of claim 1 wherein said ejection means comprises a cylindrical bolt.

4. The multiple bit power drill of claim 1 wherein said bit element has a cylindrical head and said groove defines a neck adjacent said head.

5. The multiple bit power drill of claim 1 wherein said groove defines an annular slot sufficiently wide to allow free movement of said hook element.

6. The multiple bit power drill of claim 1 wherein said ejection means comprises thrust bearing means for contacting said surface of said bit element.

7. The multiple bit power drill of claim 1 further comprising a drive shaft driven by said motor means and drivingly connected to said chuck assembly, said drive shaft extending along the central axis of said magazine.

8. The multiple bit power drill of claim 7 wherein the axis of rotation of said chuck assembly is colinear with said ejection means.

9. The multiple bit power drill of claim 1 wherein said ejection means is provided with means for releasably securing said ejection means in said rearward position.

10. The multiple bit power drill of claim 9 wherein said ejection means comprises an elongated bolt provided with a longitudinal slot having a shoulder at the forward end thereof, and said means for releasably securing comprises a key element biased for movement in said slot and adapted to bear against said shoulder when said ejection means is in said first position, and adapted to be withdrawn from said slot for removal of said ejection means from said housing.

11. A multiple bit tool comprising:
a) a housing;
b) a cylindrical magazine mounted in said housing for rotation about a longitudinal axis, said magazine provided with an array of parallel longitudinal bores open at either end thereof;
c) a plurality of bit elements, each said bit element being removably located in one of said bores, each said bit element having a bit at one end and a surface perpendicular to the length of the bit at the opposite end, and an annular groove formed in said bit element transversely to the length of the bit adjacent the opposite end;
d) a chuck assembly having a central bore for receiving a bit and means for releasably securing said bit in said assembly; and e) means for ejecting one of said bit elements from a bore and inserting said bit element into said bore in said chuck assembly, said ejection means being movable between a first rearward position withdrawn from said magazine and in which said magazine is free to rotate, to a second forward position in which said ejection means extends through one of said bores in said magazine to push a bit element out of said bore, said ejection means comprising a surface for contacting the end surface of said bit element and a hook element which is adapted to pass freely through said groove of said bit element in the direction transverse to the length of said bit, and to bear against said the rearward surface of said groove of said bit element when said ejection means is retracted;

wherein said housing comprises a bit guiding means fixed to said housing and extending into said grooves of said bit elements and provided with an aperture in the vicinity of said ejection means to allow passage of said ejection means through said guiding means, whereby said groove of a bit element is engaged by said guiding means when said magazine is rotated to guide said bit element into a position wherein said hook element of said ejection means is located in said groove when said bit element is adjacent said aperture and said ejection means is in said first position.

12. A multiple bit power drill comprising:
(a) a housing;
(b) a cylindrical magazine mounted in said housing for rotation about a longitudinal axis, said magazine provided with an array of parallel longitudinal bores open at either end thereof;
(c) a plurality of drill bit elements, each said bit element being removably located in one of said bores, each said bit element having a drill bit at one end and a surface perpendicular to the length of the bit at the opposite end, and an annular groove formed in the bit element transversely to the length of the bit adjacent the opposite end;
(d) a chuck assembly having a central bore for receiving a drill bit element and means for releasably securing said bit element in said assembly;
(e) motor means for rotating said chuck assembly;
(f) means for ejecting one of said drill bit elements from a bore and inserting said bit element into said bore in said chuck assembly, said ejection means being movable between a first rearward position withdrawn from said magazine and in which said magazine is free to rotate, to a second forward position in which said ejection means extends through one of said bores in said magazine to push a bit element out of said bore, said ejection means comprising a surface for contacting the end surface of said bit element and a hook element which is adapted to pass freely through said groove of said bit element in the direction transverse to the length of said bit element when said ejection means is in said first position, and to bear against the rearward surface of said groove of said bit element when said ejection means is moved from said second position to said first position; and
(g) bit retaining means fixed to said housing and adapted to retain said bit element in a position wherein said hook element of said ejection means is located in said groove when said bit element is adjacent said ejection means and said ejection means is in said first position, said retaining means provided with an aperture in the vicinity of said ejection means to allow passage of said ejection means through said retaining means.

13. The multiple bit power drill of claim 12 wherein said retaining means comprises an annular ring.

14. The multiple bit power drill of claim 12 wherein said ejection means comprises a cylindrical bolt.

15. The multiple bit power drill of claim 14 wherein said bolt comprises thrust bearing means for contacting said surface of said bit element.

16. A multiple bit tool comprising:
   (a) a housing;
   (b) a cylindrical magazine mounted in said housing for rotation about a longitudinal axis, said magazine provided with an array of parallel longitudinal bores open at either end thereof;
   (c) a plurality of bit elements, each said bit element being removably located in one of said bores, each said bit element having a bit at one end and a surface perpendicular to the length of the bit at the opposite end, and an annular groove formed in said bit element transversely to the length of the bit adjacent the opposite end;
   (d) a chuck assembly having a central bore for receiving a bit and means for releasably securing said bit in said assembly;
   (e) means for ejecting one of said bit elements from a bore and inserting said bit element into said bore in said chuck assembly, said ejection means being movable between a first rearward position withdrawn from said magazine and in which said magazine is free to rotate, to a second forward position in which said ejection means extends through one of said bores in said magazine to push a bit element out of said bore, said ejection means comprising a surface for contacting the end surface of said bit element and a hook element which is adapted to pass freely through said groove of said bit element in the direction transverse to the length of said bit, and to bear against said the rearward surface of said groove of said bit element when said ejection means is retracted;
   (f) bit retaining means fixed to said housing for retaining said bit element in a position wherein said hook element of said ejection means is located in said groove when said bit element is adjacent said ejection means and said ejection means is in said first position, said retaining means being provided with an aperture in the vicinity of said ejection means to allow passage of said ejection means through said retaining means.

* * * * *